United States Patent [19]
Flynn et al.

[11] Patent Number: 5,315,632
[45] Date of Patent: May 24, 1994

[54] CASSETTE CLAMPING MECHANISM

[75] Inventors: Michael R. Flynn; Wayne J. Arseneault; John C. Boutet, all of Rochester; Jeffrey J. Yaskow, Williamson; Thomas D. Baker, Livonia, all of N.Y.

[73] Assignee: Eastman Kodak Company, Rochester, N.Y.

[21] Appl. No.: 981,680

[22] Filed: Nov. 25, 1992

[51] Int. Cl.⁵ .................................. G03G 5/16
[52] U.S. Cl. .................................. 378/167; 378/181; 250/484.4; 250/584
[58] Field of Search ............... 378/181, 167, 172–174; 250/484.4, 327.2

[56] References Cited

U.S. PATENT DOCUMENTS

| | | | |
|---|---|---|---|
| 3,150,263 | 9/1964 | Catlin | 250/66 |
| 3,850,316 | 11/1974 | Schmitt | 214/16.4 |
| 4,329,589 | 5/1982 | Stievenart et al. | 378/181 |
| 4,514,958 | 5/1985 | Hoorn | 53/266 |
| 4,526,501 | 7/1985 | Blumle | 414/32 |
| 4,538,293 | 8/1985 | Cutter | 378/181 |
| 4,540,325 | 9/1985 | Heisler | 414/96 |
| 4,723,074 | 2/1988 | Kimura | 250/327.2 |
| 4,761,554 | 8/1988 | Yoshimura et al. | 250/484.4 X |
| 4,789,782 | 12/1988 | Ohara | 250/327.2 |
| 4,814,618 | 3/1989 | Saito et al. | 250/327.2 |
| 4,889,989 | 12/1989 | Yoshimura et al. | 250/484.4 X |
| 4,893,011 | 1/1990 | Bauer et al. | 250/327.2 |
| 4,904,868 | 2/1990 | Kohda et al. | 250/484.4 X |
| 4,989,227 | 1/1991 | Tirelli et al. | 378/181 X |
| 5,015,139 | 5/1991 | Baur | 414/281 |
| 5,061,852 | 10/1991 | Kawai | 250/327.2 |
| 5,120,178 | 6/1992 | Ito | 414/225 |
| 5,148,466 | 9/1992 | Fajac | 378/181 X |

*Primary Examiner*—David P. Porta
*Attorney, Agent, or Firm*—Peter J. Bilinski

[57] ABSTRACT

An apparatus for clamping a cassette containing a photosensitive element. The apparatus includes a frame and a stop bar movably mounted to the frame for movement between an operative position and a non operative position. The stop bar has a registration surface for registering the forward end of cassette. A first jaw member is secured to the frame and has a second registration surface for engagement with a first side of the cassette. A second movable jaw member is provided movable between a clamping position and a non clamping position. The second jaw member having a clamping surface for engaging a second side of the cassette opposite the first side of the cassette so as to clamp the cassette between the first and second jaw members when the second jaw member is in the clamping position. A mechanism is provided for moving the second jaw member between the clamping and non clamping positions. Sensors are also provided for sensing if the cassette is properly positioned within the clamping mechanism and position of the stop bar.

18 Claims, 5 Drawing Sheets

CASSETTE CLAMPING MECHANISM

FIELD OF THE INVENTION

The present invention is directed to a device for clamping a cassette containing a photosensitive material, and more particularly, to a reader designed to clamp a cassette containing a stimulable phosphorus element.

BACKGROUND OF THE INVENTION

Storage phosphorus film is read by photoelectrically detecting an image formed by scanning with stimulating radiation. An example of such a scanner/reader is disclosed in U.S. Pat. No. 4,789,782 to O'Hara. Typically, the cassette is fed to the reader either individually, or by an autoloader such as that described in copending application Ser. No. 981,719, filed Nov. 25, 1992 entitled "Autoloader for Cassettes and/or Pallet", by John Boutet, Roger Brahm, Darryl DeWolff and Jeffrey Yaskow, which is incorporated herein by reference. The autoloader typically presents cassettes in seriatim to the reader. The reader then takes the cassette and firmly clamps it in position and then removes the photosensitive element therein. Whether cassettes are being automatically fed by an autoloader, or manually by an operator into the reader, it is important that the clamping mechanism within the reader help guide the cassettes into position for extraction of the photosensitive element, that the mechanism not interfere with the extraction of the photosensitive material, and also isolate the cassette from the adjacent autoloader. In addition, the clamping mechanism must be able to receive a variety of different size cassettes and/or pallets containing cassettes and be able to precisely position the cassette within the reader in substantially the same position each time a cassette is presented. It is also important that the clamping mechanism provide feedback to the microprocessor control unit of the reader as to whether the cassette is properly positioned within the clamping mechanism.

Applicants invented a reader which utilizes a relatively simple mechanism for clamping the cassette and/or cassette and pallet within the reader that is able to constrain the cassette and/or pallet containing a cassette in such a manner so as not to interfere with the extraction of the photographic element therein, allows quick and easy registration of the cassette within the clamping mechanism, is reliable, easy and low cost to manufacture, and assists in isolating the transmission of vibrations through the cassette when in the clamped position. This and other advantages will be set forth in the detailed description of the present invention.

SUMMARY OF THE INVENTION

In one aspect of the present invention there is provided an apparatus for clamping a cassette containing a photosensitive element, comprising:

a frame;

a stop bar movably mounted to the frame for movement between an operative position and a non operative position, the stop bar having a registration surface for registering the forward end of cassette;

an first jaw member secured to the frame, the first jaw member having a second registration surface for engagement with a first side of the cassette;

a second movable jaw member movable between a clamping position and a non clamping position, the second jaw member having a clamping surface for engaging a second side of the cassette opposite the first side of the cassette so as to clamp the cassette between the first and second jaw members when the second jaw member is in the clamping position;

means for moving the second jaw member between the clamping and non clamping positions.

DESCRIPTION OF THE DRAWINGS

In the detailed description of the preferred embodiment of the invention presented below, reference is made to the accompanying drawings in which.

DETAILED DESCRIPTION

Figure 1:
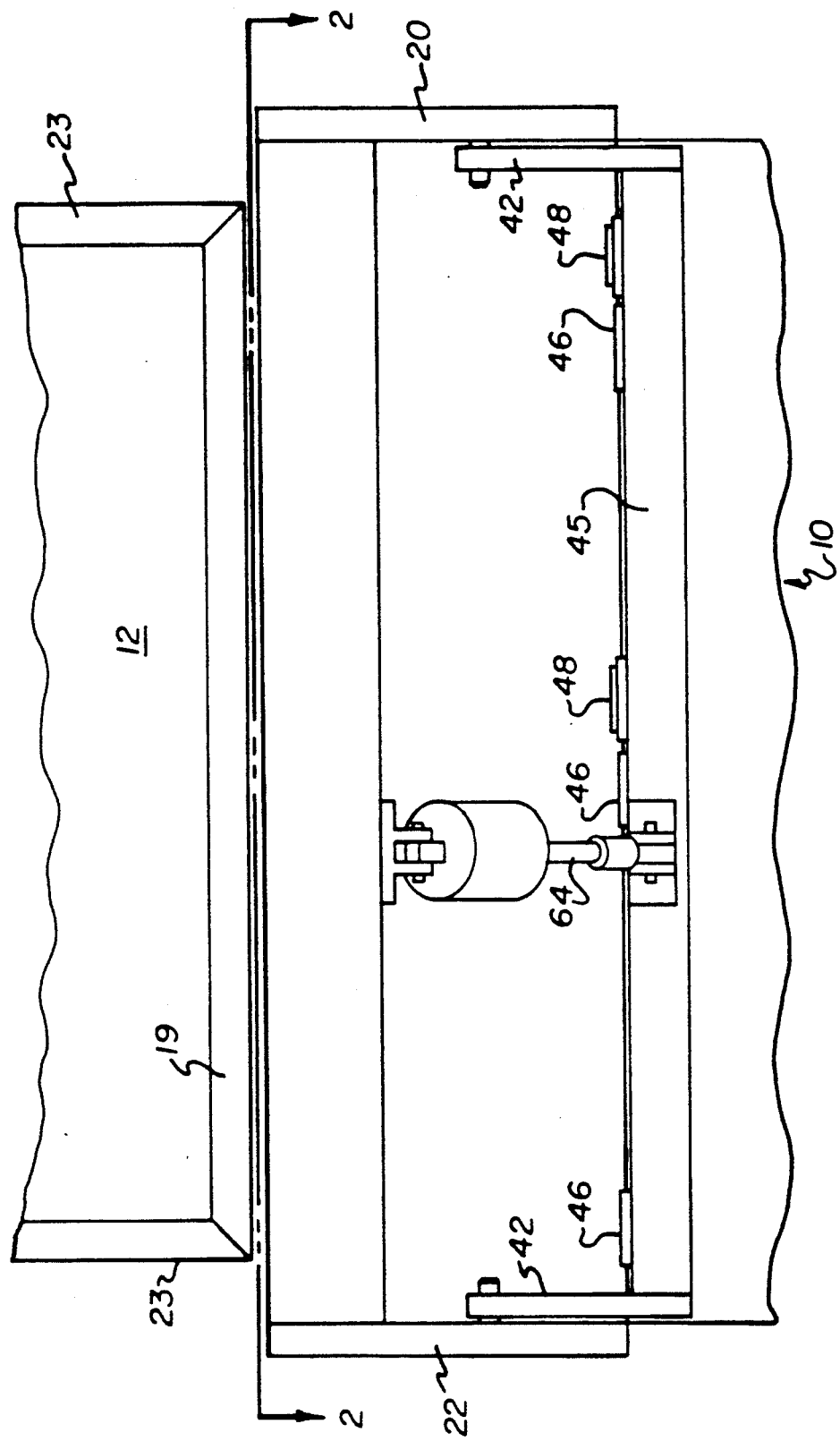
FIG. 1 is a top plan view of a clamping mechanism made in accordance with the present invention for use in a cassette reader.
Figure 2:
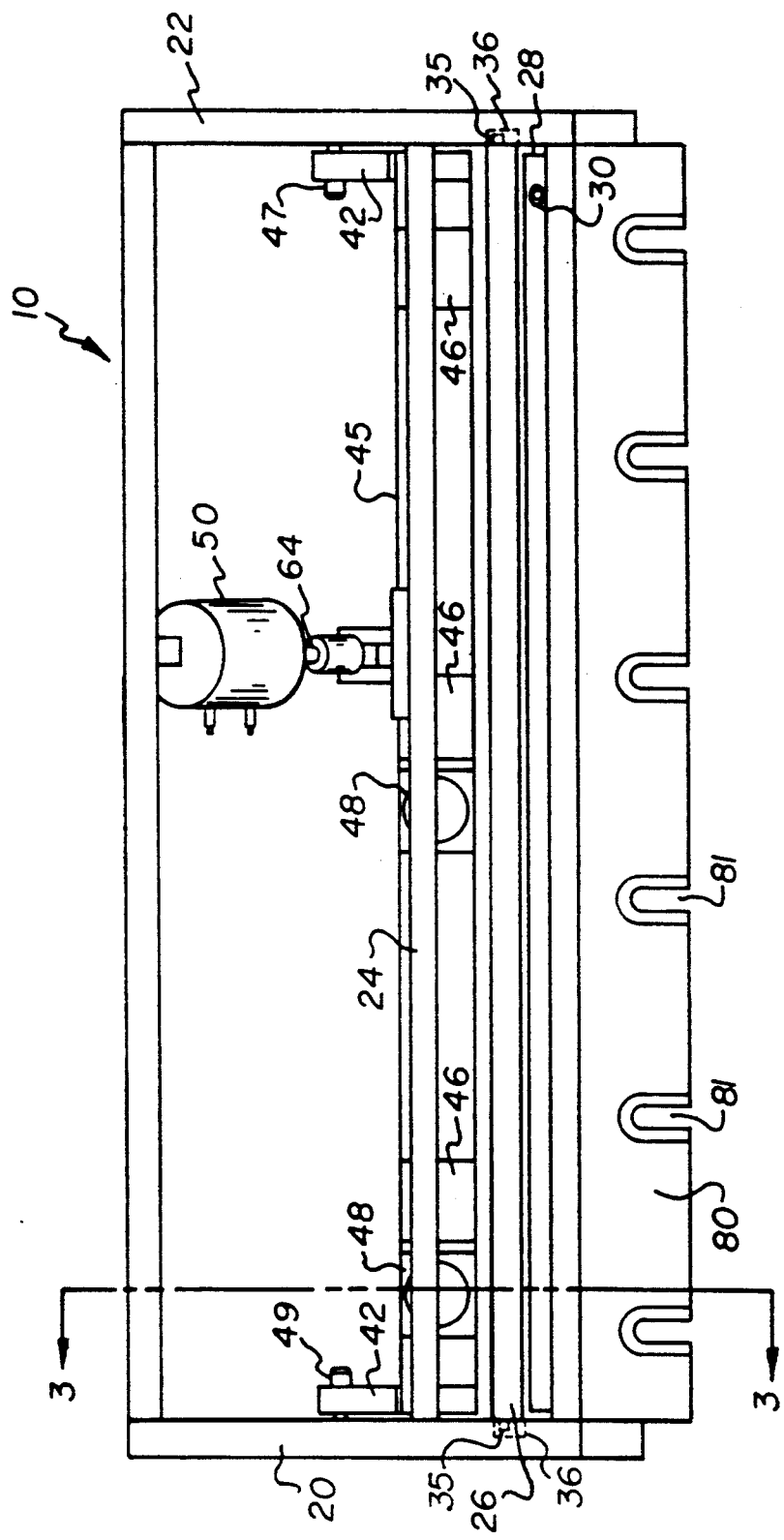
FIG. 2 is a side elevational view of the mechanism of FIG. 1 as taken along line 2—2.

Referring to the drawings, there is illustrated a clamping mechanism 10 made in accordance with the present invention. The clamping mechanism 10 is designed to be incorporated into a reader (not shown) for reading of a stored image on a stimulable phosphorus sheet/plate that has been exposed to radiation. In particular, the clamping mechanism 10 is designed for use in a raster scanning reader.

The clamping mechanism 10 is designed to receive cassettes 12 and/or pallets containing cassettes 12 such as that disclosed in U.S. Ser. No. 800,799, filed Nov. 27, 1991, entitled "X-ray Cassette Having Removable Photographic Element", by Jeffrey C. Robertson, which is also incorporated herein by reference. Briefly, the cassette, 12 comprises a shell having top and bottom panels 13,15. A photographic plate 17 of the photostimulable phosphorus type is disposed therein and is secured to a removable end cap 19. The end cap 19 includes a latching mechanism (not shown) for releasing the end cap 19 and attached plate 17 from the cassette 12. Thus, the plate 17 is designed to be removed along with the end cap 19 from the cassette 12. The details of construction of the cassette is described in the Jeffrey C. Robertson application, U.S. Ser. No. 800,799, previously referred to above.

Figure 3:
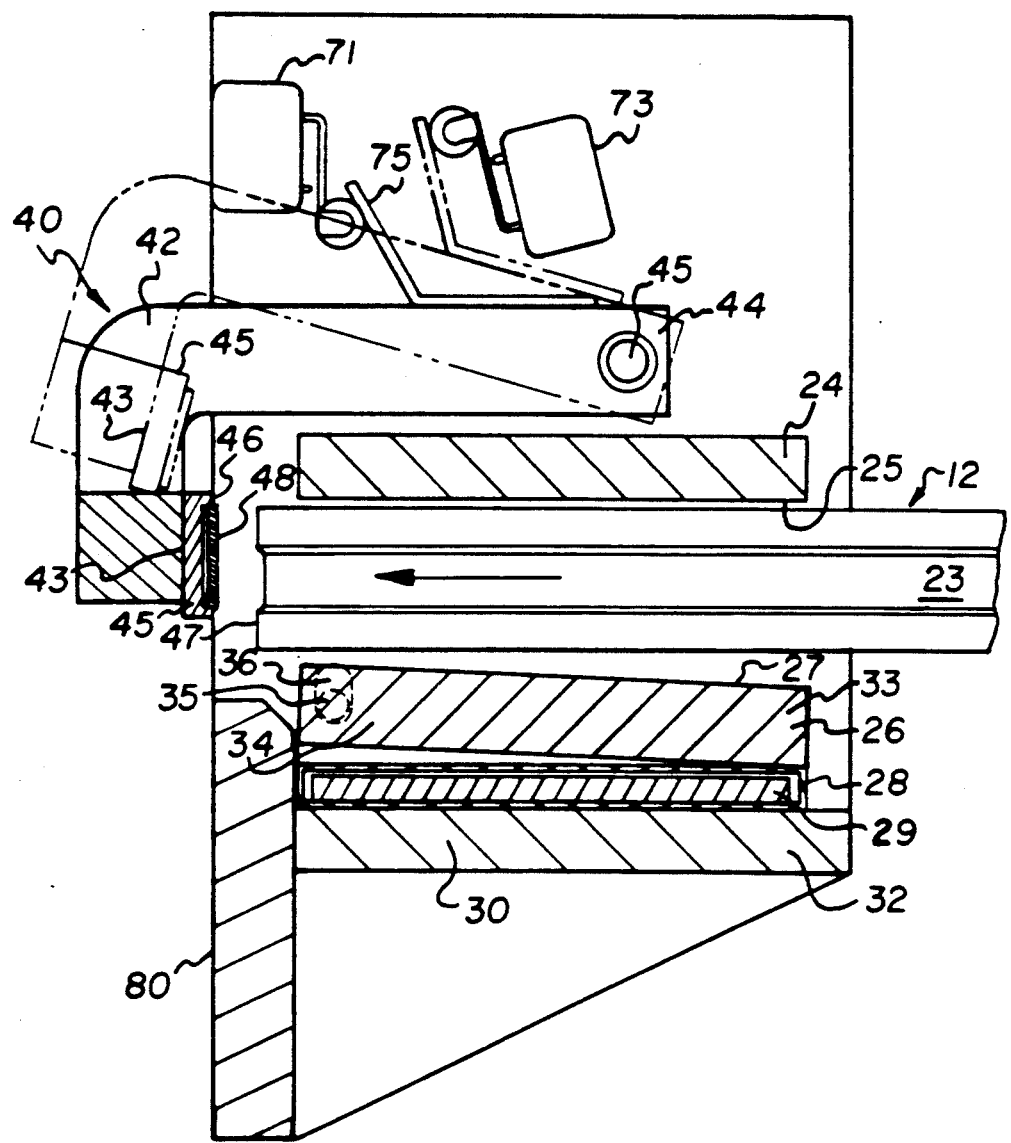
FIG. 3 is an cross-sectional view of the clamping mechanism of FIG. 2 as taken along line 3—3 in the unclamped condition.
Figure 4:
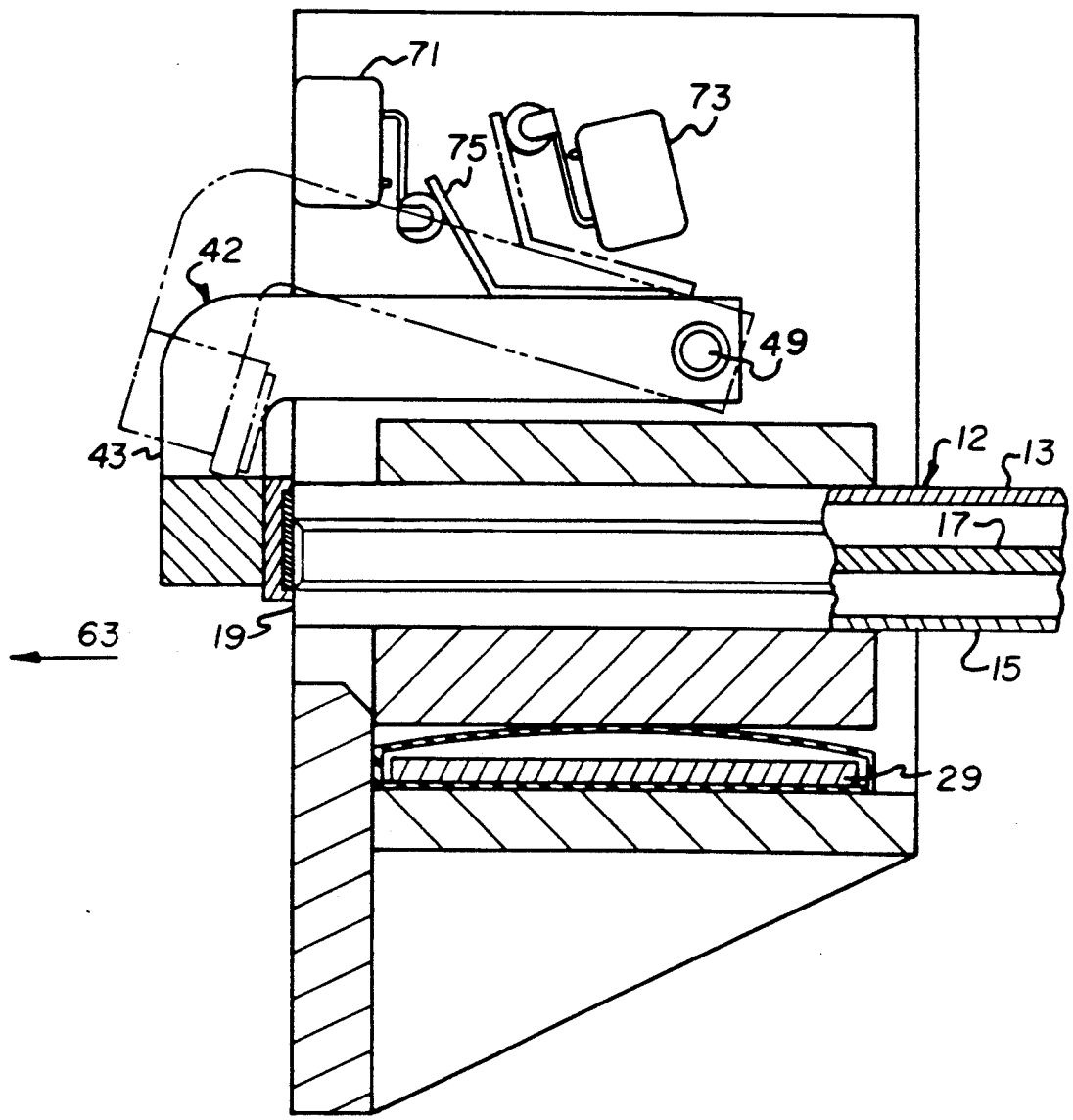
FIG. 4 is a cross-sectional view similar to FIG. 3 in the clamped position.

The clamping mechanism 10 comprises a frame 11 having a pair of end plates 20,22 having an upper jaw 24 and moveable lower jaw 26 secured thereto. The upper jaw 24 is fixed permanently in position and has a planar registration surface 25 designed to engage with the top panel 13 of the cassette 12 and the lower jaw 26 has a registration planar surface 27 designed to engage the bottom panel 15. In the preferred embodiment illustrated, the registration surfaces 25,27 are planar. In the particular embodiment illustrated, positioning of the surface of the cassette 12 actually occurs by the side extrusions 23 of the cassette 12 being held by the upper and lower jaws 24,26 which ensure the accurate vertical positioning of the cassette. Additionally, in the particular embodiment illustrated, the top panel 13 of the cassette 12 is slightly bowed outward from the cassette such that when the cassette is clamped, the top panel 13 is forced downward by the upper jaw 24. When the cassette is opened the upper jaw 24 restrains the top panel 13 so that it is maintained flat and the end cap 19 can be reengaged when the photographic element 17 is returned to the cassette. Without the top panel being bowed, it would be difficult to return the photographic element 17 to the cassette as the top panel 13 would stay down during clamping. The mechanism 10 is designed to clamp the forward end 47 of cassette 12 between the registration surfaces 25, 27 of upper jaw 24 and lower jaw 26. Since the side extrusions 23 extend below the bottom of panel 15, this jaw construction allows the full clamping force to be applied to the bottom of the side extrusions 23 of the cassette 12. When a cassette 12 is provided on a pallet, the lower jaw 26 contacts the full width of the pallet. In the preferred embodiment illustrated, the lower jaw 26 is moved to clamping position by a pneumatic bladder 28 disposed directly beneath the lower jaw 26 such that when the pneumatic bladder 28 is inflated, it will cause the cassette 12 to be clamped between the upper and lower jaws 24,26 (see FIG. 4) and when the bladder 28 is in the deflated condition (see FIG. 3), will allow releasing of the cassette 12 from between jaws 24,26. The pneumatic bladder 28 is made of an appropriate material which is substantially impervious to air such that it will maintain pressure against the lower jaw 26. A rectangular metal insert 29 is provided within bladder 28 so as to prevent the internal sides of the bladder from sticking to each other. In the preferred embodiment illustrated, the pneumatic bladder 28 is inflated using compressed air and has a substantially elongated configuration having an inlet/outlet port 30 through which a fluid, such as air, is supplied for inflating of the bladder 28 and fluid can be allowed to escape so as to allow deflation of bladder 28. A lower mounting plate 32 secured to side plates 20,22 is provided below the lower jaw 26 so as to provide a resistant force to the bladder 28 when inflated which will cause the lower jaw 26 to move toward the upper jaw 24 and thereby clamp the cassette 12 therebetween. In the clamped position, the cassette is lifted off the shelves of the adjacent reader (not shown). This results in the jaws 24,26 being the only means supporting the cassette. Therefore, this isolates the cassette 12 from the adjacent autoloader and prevents the transmission of vibration from the autoloader through the cassette to the reader that could affect the scanning of the photographic element therein. The lower mounting plate 32 may be secured to the end plates 20,22 in any desired fashion. Preferably, as illustrated in FIG. 3, the lower jaw 26 is preferably mounted to the end plates 20,22 such that, in the non operative position, the forward end 33 of plate 32 will be at a position slightly below the rear portion 34 of the lower jaw 26. In the particular embodiment illustrated, this is provided by providing a pair of cylindrical pins 35 secured to the back end of the lower jaw 26 which rides in a substantially vertically elongated slot 36 formed in side plates 20,22.

The clamping mechanism 10 further comprises a stop bar assembly 40 which provides a registration surface against which the cassette 12 registers. In particular, the stop bar assembly 40 includes a pair of arms 42 having a rear portion 44 which is pivotally mounted to the end plates 20,22. The arms 42 each have a general L-shaped configuration, with the short legs 43 of the arms 42 facing downward. The ends of legs 43 are connected to a stop bar 45 which is designed to extend along the forward end 47 of cassette 12. The stop bar 45 includes a plurality of registration surfaces 46 for mating against the forward end 47 of cassette 12. The arms 42 are movable between an engaged position as illustrated in solid lines in FIGS. 3 and 4 to a non-engaged position illustrated by phantom lines. When the arms 42 are in the engaged position, stop bar 45 through registration surfaces 46 provides a positive stop against which the cassette 12, can be, properly aligned. The registration surfaces 46 are provided with a plurality of switches 48 which are designed to engage the forward end 47 of the cassette 12. In the particular embodiment illustrated, two switches 48 are provided on the stop bar 45, however, any desired number may be used. When the cassette 12 is properly registered against the registration surfaces 46, which in the embodiment illustrated are slightly raised above the surface of the stop bar 45, the switches 48 will be depressed thus providing a signal to the microprocessor control unit 65 which controls the operation of the reader. The microprocessor 65 is connected to various elements for controlling the operation of the reader as is customarily done in similar prior art devices. If the microprocessor control unit 65 does not sense that the microswitches 48 have been properly depressed, a message or signal can be provided to the operator that a particular condition has not been met and the reader can be prevented from any further operation until the cassette has been properly aligned within the clamping mechanism. In order for the photographic element to be removed, it is important that the cassette 12 be properly aligned within the clamping mechanism, therefore, the switches 48 provide a valuable function in determining whether or not the cassette 12 has been properly located to allow extraction of the photographic element. The switches 48 are positioned so that both large and small cassettes may be properly monitored. An optional side sensing switch (not shown) may be provided in one of the end plates 20,22 for detecting if one of the sides 23 of cassette 12 has been properly registered therewith.

Once the cassette 12 has been properly positioned against the registration surfaces 46, clamping takes place. Then the arms 42 are moved to the non engaged position by pneumatic cylinder 50 connected to stop bar 45 which causes the arms 42 to rotate about hinge points 49. In this position an extraction mechanism (not shown) provided in the reader may be used to remove the photographic element from. cassette 12 for further processing within the reader. An example of a suitable extraction mechanism is set forth in detail in copending application of Roger S. Brahm and James Lattimore, entitled "Reader Having Cassette Locating and Unlatching Mechanism", filed concurrently with this application and which is also hereby incorporated by reference.

Figure 5:
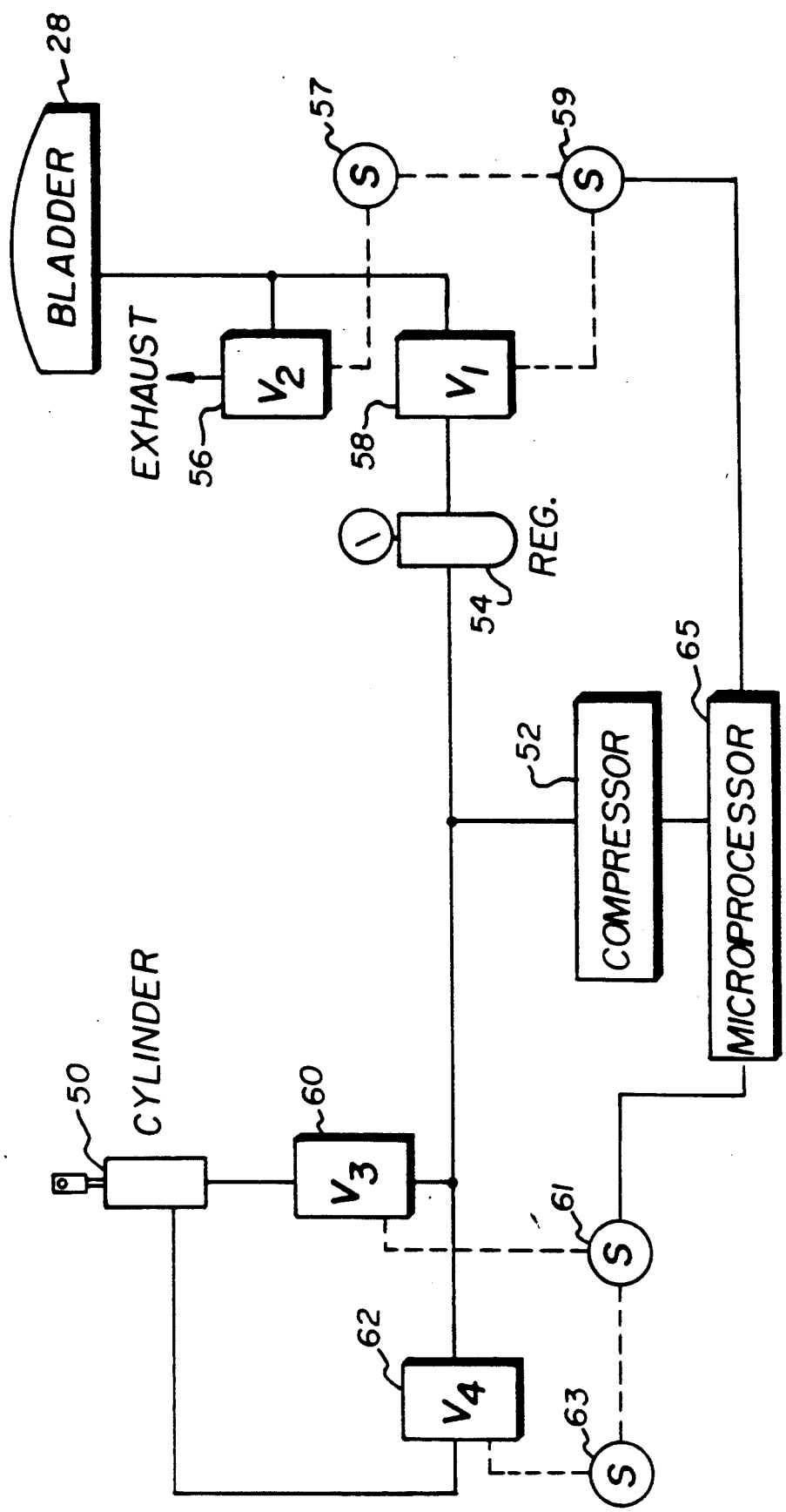
FIG. 5 is a schematic view of the pneumatic system used to operate the clamping mechanism of FIG. 1.

Referring to FIG. 5, there is illustrated a schematic diagram of the pneumatic system used to control the bladder 28 and pneumatic cylinder 50. An appropriate sized air compressor 52 is provided for providing fluid pressure to pneumatic cylinder 50 and bladder 28. In the preferred embodiment illustrated, a pressure regulator 54 is used to regulate the pressure to the bladder 28. Preferably, the bladder 28 is limited to pressures of approximately 7 psi. However, the fluid pressure may be varied as desired.

In order to assure maintaining of the fluid pressure within the bladder 28 during clamping of the cassette, a pair of valves 56,58 are provided. The valve 58 controlling pressurization of the bladder 28 and valve 56 controlling the exhaust of fluid pressure from bladder 28 when deflation is desired. Appropriate switches 57 and 59 are provided for controlling valves 56,58, respectively. The switches 57,59 are controlled by the microprocessor control unit 65 which determines when the bladder 28 should be inflated or deflated. When it is desired to inflate the bladder 28, switch 59 is energized so as to open valve 58 to allow fluid pressure to enter bladder 28 and switch 57 is energized so that valve 56 is closed. When the appropriate pressure has been provided to the bladder 28, switch 59 is activated to close valve 58, thus maintaining the desired pressure within the bladder 28. When it is desired to exhaust the fluid pressure from bladder 28 so as to release the cassette 12, switch 59 is activated so that valve 56 allows fluid to escape.

A pair of valves 60,62 are provided for controlling the action of the pneumatic cylinder 50. Appropriate switches 61,63 are provided for controlling valves 60,62, respectively. Switches 61,63 are also controlled by the microprocessor control unit 65 for properly positioning the stop bar assembly 40 as required. In particular, when it is desired to bring stop bar 45 to the position for receiving a cassette 12, valve 60 is activated so as to provide fluid pressure on cylinder 50 for driving the drive piston rod 64 to the extended position such that the arms 42 rotate about pivot point 49 thus moving registration surface 46 to the engaged position. When it is desired to move the stop bar 45 to the non-engaged position, valve 54 is energized which drives the piston rod 64 of cylinder 50 in the opposite direction causing the arms 42 to be placed in the retracted position as illustrated by phantom lines in FIGS. 3 and 4. A pair of switches 71,73 are provided for sensing an action member 75 attached to one of the arms 42. In particular, switch 71 is activated to provide a signal to the microprocessor or control unit 65 when the stop bar 45 is in the operative position for receiving a cassette and switch 73 provides an appropriate signal to microprocessor control unit 65 when the stop bar 45 is in the retracted non operative position suitable for allowing the extraction of plate 17 from the cassette 12 in the direction as indicated by arrow 63.

While the present invention has illustrated various valves and switches used to control the supply of fluid to the bladder 28 and pneumatic cylinder 50, it is to be understood that various other combinations for controlling of these elements may be provided.

The clamping mechanism 10 is further provided with a mounting plate 80 for mounting the mechanism 10 to the reader. In the embodiment illustrated, mounting plate 80 is provided with a plurality of opening/slots 81 for receiving bolts (not shown) for securing the mechanism to the reader. However, mechanism 10 may be secured to the reader in any manner desired.

In order to more fully understand the present invention, a brief description of its operation will now be discussed. First, as illustrated in FIG. 3, the lower jaw 26 is placed in the open position by the deflation of bladder 28. The clamp bar assembly 40 is placed in the engaging position as illustrated by solid lines in FIGS. 3 and 4. Thereafter, a cassette 12, either manually, or by an adjacent autoloader, is inserted within the clamping mechanism. When the switches 48 are properly seated by cassette 12 being properly positioned against the registration surface 46, the bladder 28 is caused to be inflated by the microprocessor control unit 65 properly energizing switches 57,59 to allow valves 56,58 to inflate bladder 28. Once the bladder 28 has been fully inflated and in position, the switches 57,59 are energized so as to maintain the bladder 28 in the pressurized state. Thereafter, the arms 42 of stop bar assembly 40 are moved to the non-engaged position as illustrated by phantom line in FIGS. 3 and 4. This is accomplished by appropriately activating switches 61,63 so as to place valves 60,62 in the condition causing fluid pressure to be provided to cylinder 50 such that stop bar 45 is moved to the position illustrated by phantom lines in FIGS. 3 and 4, thus allowing removal of the photographic element in a direction parallel to the cassette as shown by arrow 63. The photographic element 17 and associated end cap 19 are removed from the end of the cassette 12 by an extraction mechanism provided in the reader and the plate 17 is read by the reader as discussed in the application of Roger S. Brahm and James Lattimore, previously referred to herein. The clamping mechanism is maintained in the clamped position until the photographic element is returned within the cassette 12. After the extraction mechanism has been moved out of the way, the arms 42 are returned to the engaged position and the bladder 28 is deflated Thereafter, the cassette 12 is either removed manually, or by an adjacent automatic loader. The process is repeated as desired.

In the preferred embodiment illustrated the lower jaw is moved into the clamping position by use of pneumatic means. If desired, other means may be employed. For example, a caming mechanism (not shown) could be used to move the lower jaw 26 between the clamping and non clamping positions. In particular, a cam can be rotatably mounted to frame 11 so that it can be rotated, the cam having an outer surface engaging the bottom of moveable jaw 26 so that when the cam is rotated, the jaw member 26 will move between the unclamped position shown in FIG. 3 to the clamped position shown in FIG. 4.

The present invention provides a reliable clamping mechanism for cassettes and/or pallets containing cassettes, allows quick and easy registration of the cassette, is easy and low cost to manufacture and assists in isolating the transmission vibrations through the cassette.

It is to be understood that various modifications and changes may be made without departing from the scope of the present invention, the present invention being limited by the following claims.

We claim:

1. In an apparatus for clamping a cassette containing a photosensitive element comprising:
    a frame;
    a stop bar pivotably mounted to said frame for movement between an operative position and a non-operative position, said stop bar having a registration surface for registering the forward end of a cassette wherein said non-operating position allows extraction of a photosensitive element from said cassette;
    a first jaw member secured to said frame, said first jaw member having a second registration surface for engagement with a first side of said cassette;
    a second movable jaw member movable between a clamping position and a non-clamping position, said second jaw member having a clamping surface for engaging a second side of said cassette opposite said first side of said cassette so as to clamp said cassette between said first and second jaw members when said second jaw member is in the clamping position; and pneumatic means for moving said second jaw member between said clamping and non-clamping positions.

2. In an apparatus according to claim 1 wherein said pneumatic means includes a pneumatic bladder located adjacent said second movable jaw member which is capable of being inflated to a configuration which causes said second jaw member to move from the non clamping condition to a clamping condition such that said cassette is clamped between said first and second jaw members.

3. In an apparatus according to claim 1 wherein said stop bar includes sensing means for determining when the cassette has been properly seated against said registration surface.

4. In an apparatus according to claim 1 wherein said stop bar is pivotably mounted to said apparatus.

5. In an apparatus according to claim 1 wherein a pneumatic cylinder is used to move said stop bar between its operative and non operative positions.

6. In an apparatus according to claim 1 wherein a mounting plate is provided for resisting movement of said pneumatic means so as to cause said second jaw member to move in a direction toward said first jaw member.

7. In an apparatus according to claim 1 wherein said pneumatic means comprises:
 a source of pneumatic pressure;
 a bladder;
 valve means fluidly connected to said source of pneumatic pressure for controlling pressurization and deflation of said bladder; and
 valve means fluidly connected to said source of pneumatic pressure for controlling movement of said stop bar between said operative and non-operative positions.

8. In an apparatus according to claim 1 further comprising means for sensing when the stop bar in the operative position.

9. In an apparatus for clamping a cassette containing a photosensitive element, comprising:
 a frame;
 a stop bar pivotably mounted to said frame for movement between an operative and a non-operative position, said stop bar having a registration surface for registering the forward end of a cassette wherein said non-operative position allows extraction of a photosensitive element from said cassette;
 a first jaw member secured to said frame, said first jaw member having a second registration surface for engagement with a first side of said cassette;
 a second movable jaw member movable between a clamping position and a non-clamping position, said second jaw member having a clamping surface for engaging a second side of said cassette opposite said first side of said cassette between said first and second jaw members when said second jaw member is in the clamping position; and
 means for moving said second jaw member between said clamping and non-clamping positions.

10. In an apparatus according to claim 9 wherein said means for moving said second jaw member comprise a cam assembly which moves said second jaw member between said clamping and non-clamping positions.

11. In an apparatus according to claim 9 further comprising means for moving said stop bar between said operative and non operative positions.

12. In an apparatus according to claim 9 wherein said means for moving said second jaw member between the clamping and non clamping positions comprise a pneumatic bladder located adjacent said second movable jaw member which is capable of being inflated to a configuration which causes said second jaw member to move from the non clamping condition to a clamping condition such that said cassette is clamped between said first and second jaw members.

13. In an apparatus according to claim 9 wherein said stop bar includes sensing means for determining when the cassette has been properly seated against said registration surface.

14. In an apparatus according to claim 9 wherein said stop bar is pivotably mounted to said apparatus.

15. In an apparatus according to claim 11 wherein said means for moving said stop bar between the operative and non operative positions comprises a pneumatic cylinder.

16. In an apparatus according to claim 9 wherein a mounting plate is provided for resisting movement of said moving means so as to cause said second jaw member to move in a direction toward said first jaw member.

17. In an apparatus according to claim 9 wherein pneumatic means are used to move said stop bar.

18. In an apparatus according to claim 17 wherein said pneumatic means comprises;
 a source of pneumatic pressure;
 valve means fluidly connected to said source of pneumatic pressure for controlling movement of said stop bar between the operative and non operative position.

* * * * *